(12) United States Patent
Menendez et al.

(10) Patent No.: US 7,811,042 B1
(45) Date of Patent: Oct. 12, 2010

(54) VERTICAL CAROUSEL FOR LUMBER

(76) Inventors: Manuel J Menendez, 7035 SW. 44th St., Miami, FL (US) 33155; Paul Abramovici, 7035 SW. 44th St., Miami, FL (US) 33155

( * ) Notice: Subject to any disclaimer, the term of this patent is extended or adjusted under 35 U.S.C. 154(b) by 461 days.

(21) Appl. No.: 11/761,524

(22) Filed: Jun. 12, 2007

(51) Int. Cl.
 *B65G 1/04* (2006.01)
 *B65G 37/00* (2006.01)
 *B65G 47/00* (2006.01)

(52) U.S. Cl. ............. 414/331.04; 198/799; 211/1.55; 312/268

(58) Field of Classification Search ............. 198/469.1, 198/799, 800; 211/1.55, 1.56; 312/268; 414/248, 251, 331.04
See application file for complete search history.

(56) References Cited

U.S. PATENT DOCUMENTS

| | | | | |
|---|---|---|---|---|
| 1,887,245 A * | 11/1932 | Murray et al. | ............... | 414/251 |
| 2,673,779 A * | 3/1954 | Stewart et al. | ............... | 312/268 |
| 2,773,609 A * | 12/1956 | Holappa | ................. | 414/251 |
| 2,817,446 A * | 12/1957 | Hodous | ................. | 414/251 |
| 3,236,577 A * | 2/1966 | Woodward et al. | ........... | 312/268 |
| 3,970,349 A * | 7/1976 | Banys | ................. | 312/268 |
| 4,273,234 A * | 6/1981 | Bourgeois | ................. | 198/347.3 |
| 4,676,560 A * | 6/1987 | Schmitz et al. | ............. | 312/268 |
| 4,986,411 A * | 1/1991 | Splitstoser et al. | ........ | 198/475.1 |
| 5,108,163 A * | 4/1992 | Nakatsu | ................. | 312/268 |
| 5,161,929 A | 11/1992 | Lichti, Sr. | | |
| 5,374,149 A * | 12/1994 | Lichti | ................. | 414/234 |
| 5,447,407 A * | 9/1995 | Weaver et al. | ............. | 414/528 |
| 5,593,269 A | 1/1997 | Bernard, II | | |
| 6,814,214 B2 * | 11/2004 | Warlow et al. | ............. | 198/300 |

FOREIGN PATENT DOCUMENTS

JP          63-74808 A  *  4/1988  ................. 198/799

* cited by examiner

*Primary Examiner*—James Keenan
(74) *Attorney, Agent, or Firm*—Albert Bordas, P.A.

(57) ABSTRACT

A vertical carousel for lumber that provides storage for various lengths, sizes, and grades of wood. It comprises a housing structure, a carousel assembly, a motor assembly, and first and second gear assemblies. The carousel assembly is housed within the housing structure and comprises first and second drive chains that engagingly travel upon respective pulleys. The first and second drive chains have at least one cradle that is perpendicularly disposed and fixedly secured between them. The cradle has a first end and a second end. Extending from the first end to the second end is a concave base having first and second longitudinal edges. The first and second longitudinal edges have peripheral notches to receive forks of a forklift vehicle so that lumber may be placed onto the concave base. The cradle also has spindles with means to rock while it moves with the drive chains around the carousel assembly.

5 Claims, 4 Drawing Sheets

VERTICAL CAROUSEL FOR LUMBER

BACKGROUND OF THE INVENTION

1. Field of the Invention

The present invention relates to material handling equipment, and more particularly, to a vertical carousel for lumber that provides storage for an efficient selection of lengths, sizes, and grades of wood.

2. Description of the Related Art

Modern sawmills typically require that lumber be transported on conveyors. Several conveyors for lumber have been developed in the past. None of them, however, facilitates storage for a selection of lumber lengths, sizes, and grades for performing other functions such as a cutting operation.

Applicant believes that one of the closest references correspond U.S. Pat. No. 5,161,929 issued to Lichti, Sr. on Nov. 10, 1992 for an automated work center. However, it differs from the present invention, because Lichti, Sr. teaches an automated integrated workstation for handling goods within distribution and production environments. Furthermore, Lichti, Sr. teaches that the workstation is specifically adapted for consolidating goods.

Applicant believes that another reference corresponds U.S. Pat. No. 5,593,269 issued to Bernard, II on Jan. 14, 1997 for an automated work center. However, it differs from the present invention, because Bernard, II teaches an automated work center for use in material handling operations. More specifically, Bernard, II teaches a work center including a randomly accessible vertically moving temporary storage queue 11 for receiving containers 25 that holds material goods. A fixed loading ramp 20 is arranged to receive containers 20 from an external system and to load the received containers onto the storage queue 11. A work area 5, having a plurality of rotatable worktables 7, provides and gives an operator access to the containers. A delivery system 14 transfers containers between the storage queue 11 and the worktables 7, and a takeaway system 16 transfers containers between the work area and the conveyor network. An automated control system 17 coordinates the delivery of containers between the temporary storage queue 11 and the work area 5. A consolidation queue 18, having a multiplicity of vertically spaced shelves, may be disposed opposite the worktables 7 to facilitate the consolidation of ordered goods.

Other patents describing the closest subject matter provide for a number of more or less complicated features that fail to solve the problem in an efficient and economical way.

None of these patents suggest the novel features of the present invention. Such novel features include efficiently providing a single in-feed operator an arm's length selection of lengths, sizes, and grades of wood members to choose from, thus not limiting the operator to stopping a cutting operation and placing the desired selection of wood nearby.

SUMMARY OF THE INVENTION

In the preferred embodiment, the instant invention defines a carrousel for wood trusses. It serves as a wood sorter from which manual selection of differing wood members is done for introducing into a cutting machine. It may comprise an eight-drawer vertical revolving carrousel, capable of holding entire bundles of wood of different types. In operation, an in-feed operator simply approaches a drawer he or she needs next to the in-feed of the cutting machine. The operator has variety, quantity, and fast accessibility at his/her fingertips, thus speeding up production.

In the preferred embodiment, the instant invention is used in the wood truss industry, which employs bundles of one type of length, species, and size of wood. These bundles are placed in their entirety in cradle-type drawers that prevent spillage of the members once metal strips that tie the bundles are cut for access. The drawers are designed to receive the forks of a forklift. Entire tied bundles are placed in every drawer by the forklift, but once placed onto the instant invention their numbers are reduced by breaking bundles and individually picking members. The instant invention stands vertically, thus reducing its footprint or necessity for space. Furthermore, the instant invention does not transport wood from one point to another linearly.

More specifically, the instant invention is a vertical carousel for lumber, comprising a housing structure having a carousel assembly secured within. The carousel assembly comprises first and second drive chains that engagingly travel upon plurality of pulleys. The first and second drive chains have at least one cradle perpendicularly disposed and fixedly secured between them. Each cradle has first and second ends. Extending from each first end to each second end is concave base having first and second longitudinal edges. The first and second longitudinal edges have peripheral notches to receive forks of a forklift vehicle so that lumber may be placed onto the concave base. Each cradle also has spindles with means to rock while it moves with the drive chains around the carousel assembly. A motor assembly has means to synchronize and operate the carousel assembly; and first and second gear assemblies connect the motor assembly to the carousel assembly.

The housing structure comprises a base, sidewalls, a front wall, a rear wall, and a top wall to house the carousel assembly, the motor assembly and the first and second gear assemblies. The sidewalls are parallel with respect to each other. One sidewall has a first aperture to receive the lumber onto a cradle and the other sidewall has a second aperture to obtain the lumber from the cradle. The first sidewall has a first control box adjacent to the aperture to engage the motor assembly for cradle positioning with relation to its aperture. The second sidewall has its own respective control box adjacent to its aperture to engage the motor assembly for cradle positioning with relation to its aperture. The cradles provide storage for various lengths, sizes, and grades of lumber.

The plurality of pulleys are aligned and cooperatively disposed opposite to each other. The plurality of pulleys is mounted to the front wall and rear wall. In the preferred embodiment, the motor assembly is a double synchronized reversible motor assembly with AC variable speed. The motor assembly comprises synchronized motors that are connected to each other with connecting member and to the first and second gear assemblies with shafts. The first and second gear assemblies comprise housings that house gears and bearings that will be further specified.

It is therefore one of the main objects of the present invention to provide a vertical carousel for lumber that provides storage for various lengths, sizes, and grades of wood.

It is another object of this invention to provide a vertical carousel for lumber that provides an efficient, single, lumber in-feed.

It is another object of this invention to provide a vertical carousel for lumber that provides storage to facilitate the selection of lumber for distribution and production environments.

It is another object of this invention to provide a vertical carousel for lumber having a revolving carousel assembly from which an operator can peruse and select lumber for sawing.

It is another object of this invention to provide a vertical carousel for lumber that safely and effectively contains bundles of lumber that are placed in their entirety on cradles.

It is another object of this invention to provide a vertical carousel for lumber that prevents lumber spillage once bundle metal strips that tie the bundles are cut for lumber access.

It is yet another object of this invention to provide a vertical carousel for lumber having cradles designed to receive forks of a forklift.

It is yet another object of this invention to provide a vertical carousel for lumber that is volumetrically efficient.

It is yet another object of this invention to provide a vertical carousel for lumber that provides storage for lumber variety, quantity, and fast accessibility for increased productions.

It is still another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
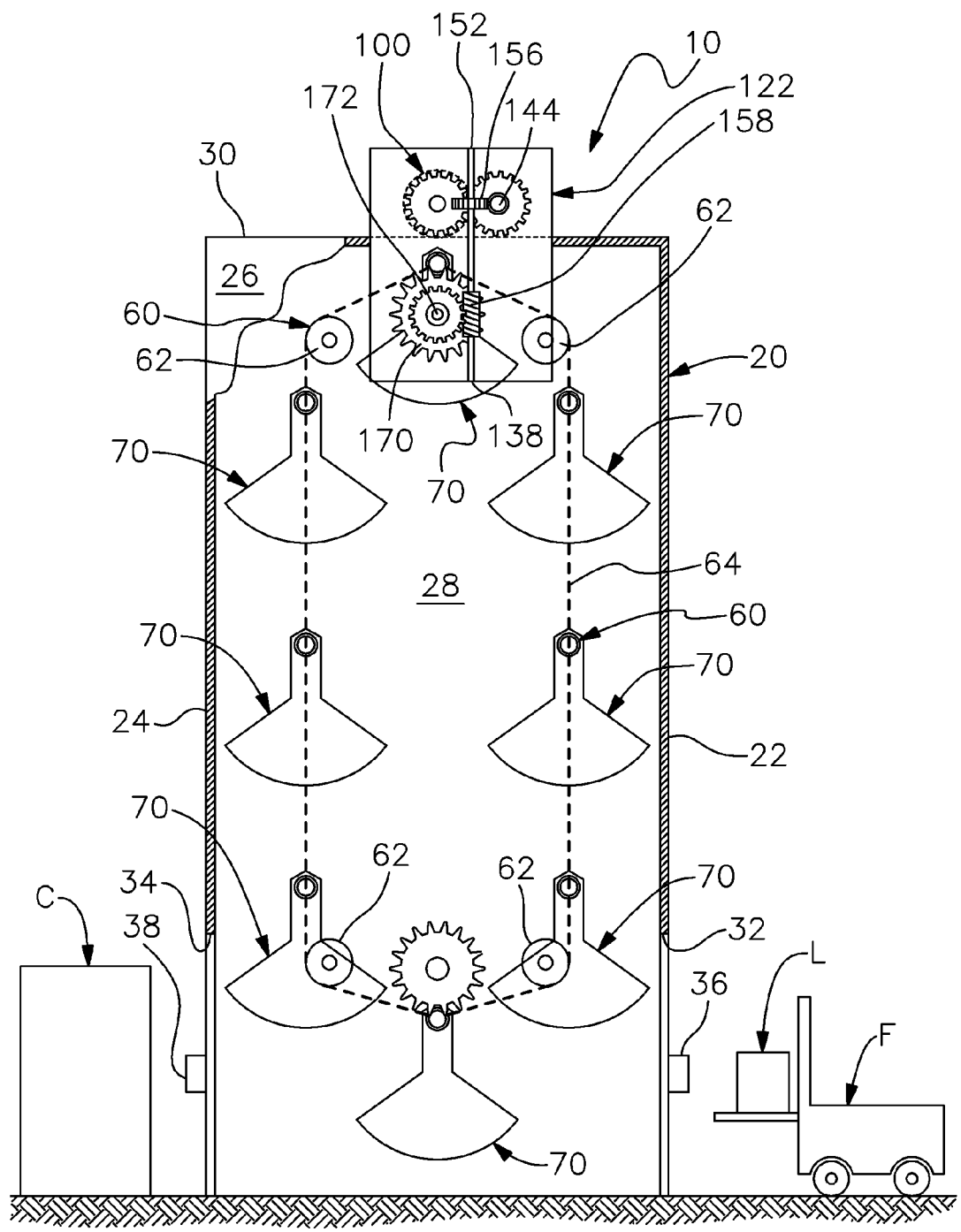
FIG. 1 represents a front elevational view of a vertical carousel for lumber, object of the present invention.

Referring now to the drawings, the present invention is generally referred to with numeral 10. It can be observed that it basically includes housing structure 20, carousel assembly 60, cradles 70, motor assembly 100, and gear assemblies 120 and 120'.

Figure 2:
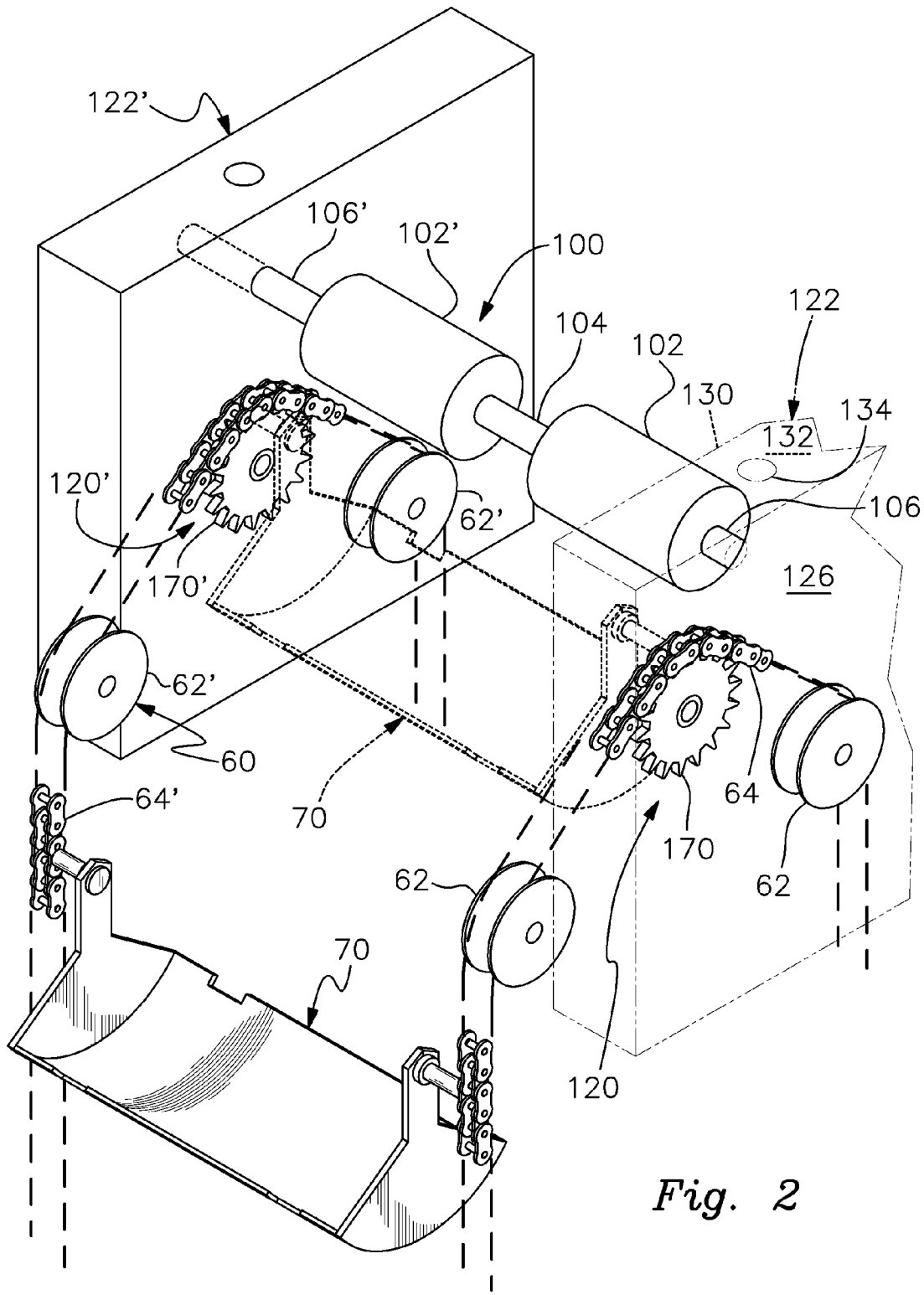
FIG. 2 illustrates an isometric view of a cradle, motor assembly, and gear assembly.

As seen in FIG. 1, in the preferred embodiment, housing structure 20 comprises a base, sidewalls 22 and 24, front wall 26, rear wall 28, and top wall 30 to house carousel assembly 60, cradles 70, motor assembly 100, and gear assemblies 120 and 120', seen in FIG. 2. Sidewall 22 has control box 36 and aperture 32. An operator, to control instant invention 10, utilizes control box 36, and more specifically, to engage motor assembly 100 for cradle 70 positioning with relation to aperture 32. Aperture 32 serves as an inlet for lumber L. In the preferred embodiment, lumber L may be transported by forklift F in bundles. Typically, bundle metal strips, not seen, tie lumber bundles to keep them contained. Upon alignment of a predetermined cradle 70 with aperture 32, the operator may position lumber L onto the respective cradle 70. Once lumber L is positioned onto cradle 70, its bundle metal strips may be removed. Sidewall 24 has control box 38 and aperture 34. An operator, to engage motor assembly 100 for cradle 70 positioning with relation to aperture 34, also utilizes control box 38. Aperture 34 serves as an outlet for lumber L whereby the operator may pick lumber from. Once picked, lumber L may be handled or manipulated such as with cutting unit C. It is noted that for safety reasons, instant invention 10 comprises means so that either control box 36 or 38 may be used by operators, but not both simultaneously. Such means may be a toggle power switch so that only control box 36 or 38 is active.

As seen in FIGS. 1 and 2, carousel assembly 60 comprises a plurality of pulleys 62 and 62' that have drive chains 64 and 64' mounted respectively thereon, and a plurality of cradles 70. In the preferred embodiment, carousel assembly 60 comprises four pulleys 62 and four pulleys 62'. Pulleys 62 are aligned and are opposite with respect to pulleys 62'. Pulleys 62 are mounted to front wall 26 of housing structure 20, and pulleys 62' are mounted to rear wall 28. In this illustration, each set of four pulleys 62 and 62' are positioned in a four-point setting. However, other positions can be arranged for pulleys 62 and 62', according to the dimension and shape of housing structure 20 and the requirements for carousel assembly 60. In the preferred embodiment, drive chains 64 and 64' are link chains. Drive chain 64 travels upon pulleys 62, and drive chain 64' travels upon pulleys 62'.

Figure 3:
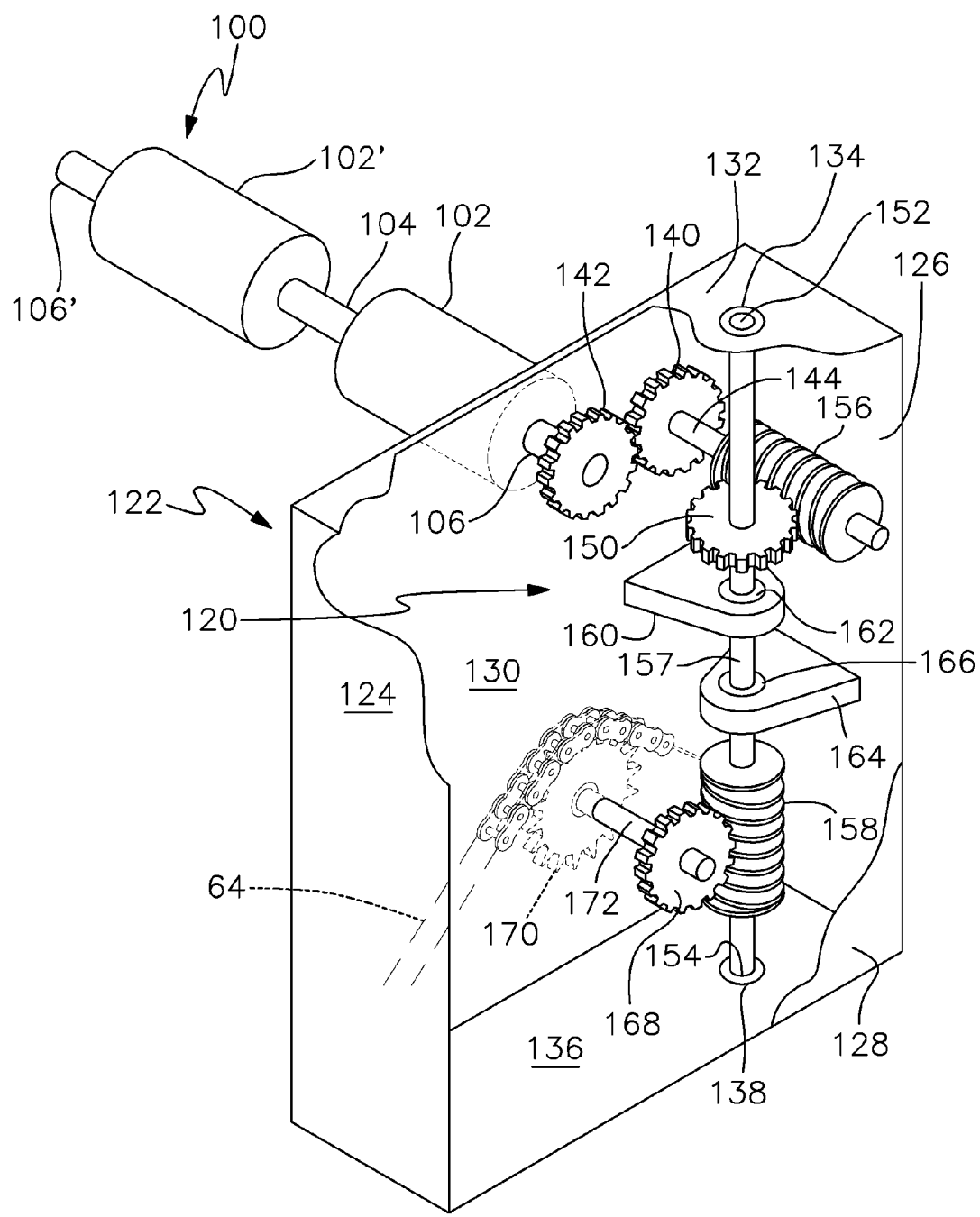
FIG. 3 represents an isometric detailed view of one gear assembly.

As seen in FIGS. 2 and 3, motor assembly 100 is a double synchronized reversible motor assembly with AC variable speed. Motor assembly 100 comprises synchronized motors 102 and 102'. Synchronized motors 102 and 102' are connected to each other with connecting member 104 and to gear assemblies 120 and 120' with shafts 106 and 106', respectively. Motor assembly 100 is used to operate carousel assembly 60. As seen in this illustration, drive chains 64 and 64' are mounted to drive wheels 170 and 170' respectively to operate carousel assembly 60.

As seen in FIG. 3, for simplification, only gear assembly 120 is illustrated, since gear assembly 120' is a mirror image of it. Gear assembly 120 is housed within housing 122. Housing 122 has sidewalls 124, 126, 128 and 130, top wall 132 with opening 134, and bottom wall 136 with opening 138. Gear assembly 120 comprises gear 142 that is directly mounted onto shaft 106 of synchronized motor 102. Gear 142 engages with gear 140 that is mounted to an upper portion of sidewall 130. Extending from gear 140 is worm-shaft 144. Mounted onto worm-shaft 144 is upper-worm gear 156. Upper-worm gear 156 engages with gear 150 that is rotatably mounted onto elongated member 157. Elongated member 157 has ends 152 and 154. End 152 is rotatably mounted to opening 134 and end 154 is rotatably to opening 138. Ends 152 and 154 are vertically secured to top wall 132 and bottom wall 136 respectively. Supporting members 160 and 164, fixed to sidewalls 130 and 126 respectively, secure elongated member 157 in place. Supporting members 160 and 164 have bearings 162 and 166 respectively that permit free rotational movement of elongated member 157. Also mounted onto elongated member 157 is lower-worm gear 158. Lower-worm gear 158 engages with gear 168 that is rotatably mounted onto shaft 172 that is connected to drive wheel 170.

Figure 4A:
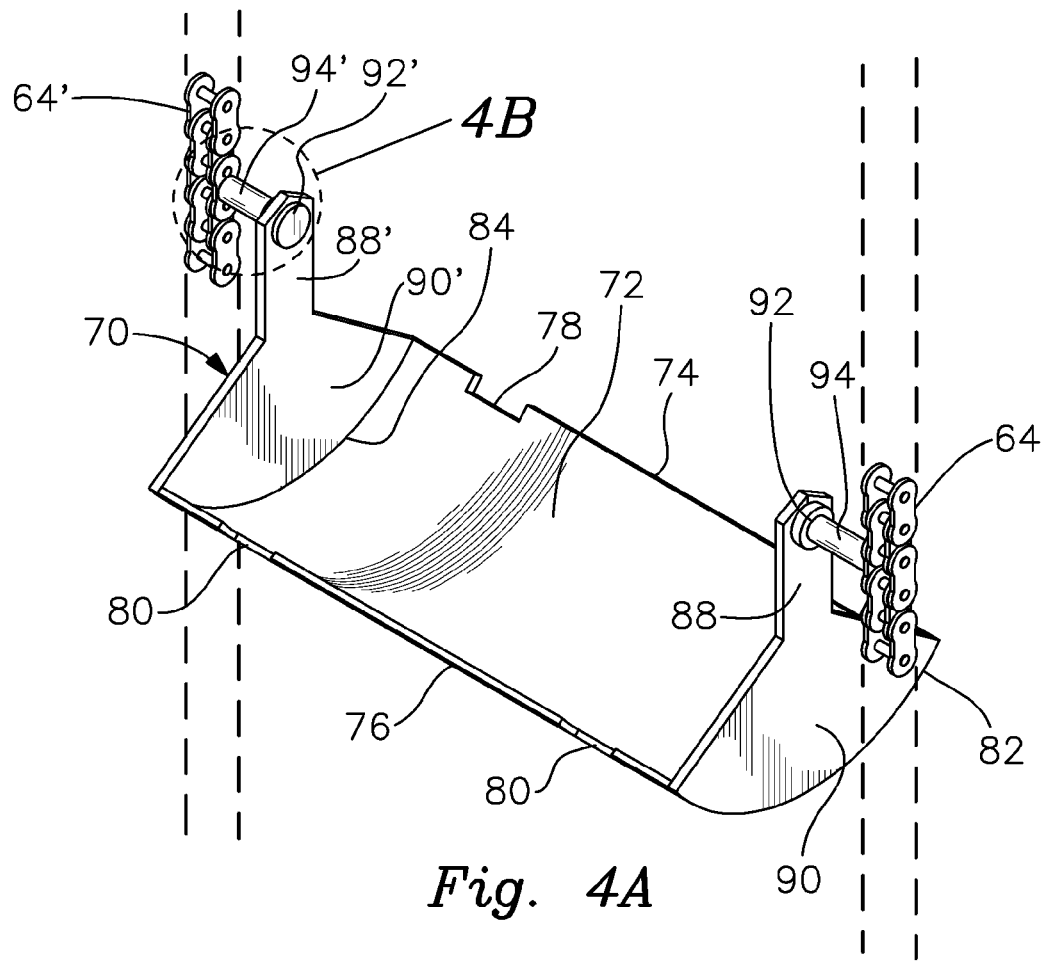
FIG. 4A shows an isometric view of a cradle as suspended from drive chains.
Figure 4B:
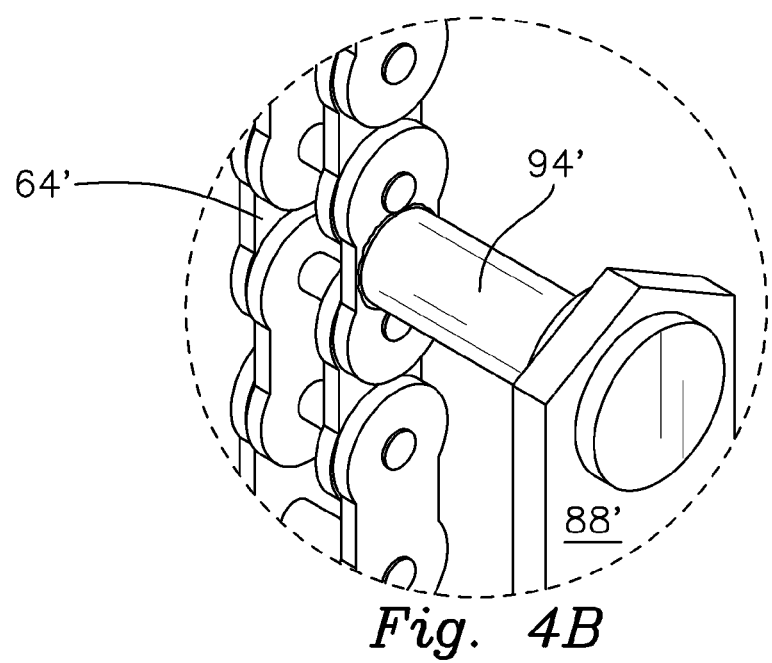
FIG. 4B shows a close up view of a spindle, as seen in FIG. 4A.

As seen in FIGS. 4A and 4B, cradle 70 comprises concave base 72 that has longitudinal edges 74 and 76 with respective peripheral notches 78 and 80, and ends 82 and 84. Sidewalls 90 and 90' extend approximately perpendicularly from concave base 72 from respective ends 82 and 84, and terminate as side arms 88 and 88' respectively. Peripheral notches 78 and 80 are cooperatively disposed to receive the forks of forklift F, seen in FIG. 1, when they deposit lumber L onto cradle 70. Side arms 88 and 88' have through holes 92 and 92'. Spindles 94 and 94' connect through holes 92 and 92' to drive chains 64 and 64' respectively. Spindles 94 and 94', as means to rock, permit each cradle 70 to rock while they move with drive chains 64 and 64' around carousel assembly 60.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A vertical carousel for lumber, comprising:

A) a housing structure (20) comprising a base, first and second sidewalls (22) and (24), front wall (26), rear wall (28), and top wall (30), said first and second sidewalls (22) and (24) are parallel with respect to each other, said first sidewall (22) has a first aperture (32) and said second sidewall (24) has a second aperture (34), said first sidewall (22) further has a first control box (36) adjacent to said first aperture (32), and said second sidewall (24) further has a second control box (38) adjacent to said second aperture (34);

B) a carousel assembly (60) secured and housed within said housing structure (20), said carousel assembly (60) comprising a first drive chain (64) and a second drive chain (64') that engagingly travel upon a plurality of first and second pulleys (62) and (62') respectively, said first drive chain (64) and said second drive chain (64') having at least one cradle (70) perpendicularly disposed and fixedly secured between them, said at least one cradle (70) having a first end (82) and a second end (84), extending from said first end (82) to said second end (84) is concave base (72) having first and second longitudinal edges (74) and (76), said first and second longitudinal edges (74) and (76) having first and second peripheral notches (78) and (80) respectively to receive forks of a forklift vehicle so that lumber may be placed onto said concave base (72), said at least one cradle (70) also having first and second spindles (94) and (94') with means to rock while it moves with said first drive chain (64) and said second drive chain (64') around said carousel assembly (60), said first aperture (32) of said first sidewall (22) receives said lumber onto said at least one cradle (70) and said second aperture (34) of said second sidewall (24) obtains said lumber from said at least one cradle (70), a plurality of said at least one cradle (70) provides storage for various lengths, sizes, and grades of said lumber, said plurality of first and second pulleys (62) and (62') are aligned and cooperatively disposed opposite to each other, said plurality of first pulleys (62) are mounted to said front wall (26) and said plurality of second pulleys (62') are mounted to said rear wall (28);

C) a motor assembly (100) with means to synchronize and operate said carousel assembly (60), said motor assembly is housed within said housing structure (20), said first control box (36) is utilized to engage said motor assembly (100) for said at least one cradle (70) positioning with relation to said first aperture (32), and said second control box (38) is utilized to engage said motor assembly (100) for said at least one cradle (70) positioning with relation to said second aperture (34), said motor assembly (100) is a double synchronized reversible motor assembly with AC variable speed, said motor assembly (100) further comprises first and second synchronized motors (102) and (102') that are connected to each other with connecting member (104); and D) first and second gear assemblies (120) and (120') that connect said motor assembly (100) to said carousel assembly (60), said first and second gear assemblies (120) and (120') are housed within said housing structure (20), said first and second synchronized motors (102) and (102') are connected to said first and second gear assemblies (120) and (120') with first and second shafts (106) and (106') respectively, each of said first and second gear assemblies (120) and (120') comprises first and second housings (122) and (122') respectively, that each houses a first gear (142) that is directly mounted onto said first and second shafts (106) and (106') respectively, said first gear (142) engages with a second gear (140), extending from said second gear (140) is a first worm-shaft (144), mounted onto said first worm-shaft (144) is an upper-worm with a third gear (150) that is rotatably mounted onto an elongated member (157), said first housing (122) comprises third, fourth, fifth and sixth sidewalls (124), (126), (128) and (130), top wall (132) with a first opening (134), and bottom wall (136) with a second opening (138), said first housing (122) houses said elongated member (157), said elongated member (157) has third and fourth ends (152) and (154), said third end (152) is rotatably mounted to said first opening (134) and said fourth end (154) is rotatably mounted to said second opening (138), said third and fourth ends (152) and (154) are vertically secured to said top wall (132) and said bottom wall (136) respectively.

2. The vertical carousel for lumber set forth in claim 1, further characterized in that first and second supporting members (160) and (164) are fixed to said sixth and fourth sidewalls (130) and (126) respectively to secure said elongated member (157) in place, said first and second supporting members (160) and (164) have first and second bearings (162) and (166) respectively that permit free rotational movement of said elongated member (157), said elongated member (157) also has said third gear (150) and a lower worm-gear (158) mounted thereon.

3. The vertical carousel for lumber set forth in claim 2, further characterized in that said lower-worm gear (158) engages with a fourth gear (168) that is rotatably mounted onto a third shaft (172) that is connected to its respective first and second drive wheel (170) and (170').

4. The vertical carousel for lumber set forth in claim 3, further characterized in that said first drive chain (64) is mounted to said first drive wheel (170) and said second drive chain (64') is mounted to said second drive wheel (170').

5. The vertical carousel for lumber set forth in claim 4, further characterized in that said first drive chain (64) and said second drive chain (64') are link chains.

* * * * *